(12) United States Patent
Zhang

(10) Patent No.: US 10,289,214 B2
(45) Date of Patent: May 14, 2019

(54) METHOD AND DEVICE OF CONTROLLING VIRTUAL MOUSE AND HEAD-MOUNTED DISPLAYING DEVICE

(71) Applicant: Beijing Pico Technology Co., Ltd., Hai Dian District (CN)

(72) Inventor: Ruisheng Zhang, Hai Dian District (CN)

(73) Assignee: Beijing Pico Technology Co., Ltd., Hai Dian District (CN)

( * ) Notice: Subject to any disclaimer, the term of this patent is extended or adjusted under 35 U.S.C. 154(b) by 204 days.

(21) Appl. No.: 15/342,667

(22) Filed: Nov. 3, 2016

(65) Prior Publication Data

US 2017/0242495 A1 Aug. 24, 2017

(30) Foreign Application Priority Data

Feb. 24, 2016 (CN) .......................... 2016 1 0101873

(51) Int. Cl.
*G06F 3/0346* (2013.01)
*G06F 3/01* (2006.01)
(Continued)

(52) U.S. Cl.
CPC ....... *G06F 3/0346* (2013.01); *G02B 27/0093* (2013.01); *G02B 27/01* (2013.01);
(Continued)

(58) Field of Classification Search
CPC ................ G02B 27/0093; G02B 27/01; G02B 27/0149; G06F 3/012; G06F 3/0346; G06F 3/0383
See application file for complete search history.

(56) References Cited

U.S. PATENT DOCUMENTS

| 8,947,323 B1 * | 2/2015 | Raffle | G09G 3/001 345/156 |
| 2006/0012571 A1 * | 1/2006 | Rodgers | G06F 3/012 345/157 |

(Continued)

FOREIGN PATENT DOCUMENTS

| CN | 102156537 A | 8/2011 |
| CN | 102192740 A | 9/2011 |

(Continued)

OTHER PUBLICATIONS

State Intellectual Property Office of the People's Republic of China, Office Action in Chinese Patent Application No. 201610101873.0 dated Apr. 13, 2018.

*Primary Examiner* — Afroza Chowdhury
(74) *Attorney, Agent, or Firm* — LKGlobal | Lorenz & Kopf, LLP

(57) ABSTRACT

A method and device of controlling a virtual mouse and a head-mounted displaying device are disclosed. The method of controlling a virtual mouse includes, but is not limited to utilizing a sensor provided in a head-mounted displaying device to gather a user's head motion data; calculating the gathered head motion data, to obtain a two-dimensional coordinate value in a coordinate system where the displaying screen of the head-mounted displaying device is located; and according to the two-dimensional coordinate value, controlling a virtual mouse of the head-mounted displaying device to perform a corresponding mouse moving operation on the displaying screen. The method directly controls the moving of a virtual mouse according to the user's head motion, and omits externally connected physical mice. Therefore the input control of the head-mounted displaying device is more precise, user operation is facilitated, and the usage experience is improved.

9 Claims, 3 Drawing Sheets

(51) Int. Cl.
*G06F 3/038* (2013.01)
*G02B 27/01* (2006.01)
*G02B 27/00* (2006.01)

(52) U.S. Cl.
CPC ......... *G02B 27/0149* (2013.01); *G06F 3/012* (2013.01); *G06F 3/0383* (2013.01)

(56) References Cited

U.S. PATENT DOCUMENTS

| | | | | |
|---|---|---|---|---|
| 2013/0057679 | A1* | 3/2013 | Tiao | G09G 5/00 348/135 |
| 2015/0062164 | A1* | 3/2015 | Kobayashi | G06T 19/006 345/633 |
| 2015/0241969 | A1* | 8/2015 | Elangovan | G06F 3/014 345/156 |
| 2017/0003764 | A1* | 1/2017 | Li | G06T 19/006 |
| 2017/0148206 | A1* | 5/2017 | Donner | G06T 15/04 |

FOREIGN PATENT DOCUMENTS

| | | |
|---|---|---|
| CN | 102282527 A | 12/2011 |
| CN | 203276168 U | 11/2013 |
| CN | 103977539 A | 8/2014 |
| CN | 104866105 A | 8/2015 |
| CN | 204576420 U | 8/2015 |
| CN | 105116544 A | 12/2015 |
| CN | 105204642 A | 12/2015 |
| CN | 105224064 A | 1/2016 |
| CN | 105283825 A | 1/2016 |
| CN | 105302404 A | 2/2016 |
| CN | 105320820 A | 2/2016 |

* cited by examiner

METHOD AND DEVICE OF CONTROLLING VIRTUAL MOUSE AND HEAD-MOUNTED DISPLAYING DEVICE

CROSS-REFERENCE TO RELATED APPLICATION

This application claims the benefit and priority of Chinese Patent Application No. 201610101873.0 filed Feb. 24, 2016. The entire disclosure of the above application is incorporated herein by reference.

TECHNICAL FIELD

The present application pertains to the technical field of head-mounted displaying device, and particularly to a method and device of controlling a virtual mouse and a head-mounted displaying device.

BACKGROUND

Currently, with the development of head-mounted displaying devices (Head Mount Display, HMD) and virtual reality technology, users have increasingly more demand on the diversity of the contents of head-mounted displaying devices. The conventional head-mounted displaying devices have no uniform standard, which results in that head-mounted displaying devices cannot support many contents, and can generally only support 3D applications such as 3D games, and are not able to support 2D applications.

If 2D applications can be compatible with head-mounted displaying devices, that will undoubtedly greatly rich the contents of head-mounted displaying devices. However, head-mounted displaying devices are to be worn at the head of the user at use, the display screen is wrapped within the head-mounted displaying device, and the fingers and the display screen are separated. Therefore, the user cannot control head-mounted displaying devices in the similar ways as he operates a PC via a physical mouse or controls a mobile telephone via a touch screen.

Therefore it can be seen that, the conventional head-mounted displaying devices lack convenient and effective user controlling mode, which limits the development of the applying of 2D applications in head-mounted displaying devices.

In addition, other objects, desirable features and characteristics will become apparent from the subsequent summary and detailed description, and the appended claims, taken in conjunction with the accompanying drawings and this background.

SUMMARY OF THE DISCLOSURE

The present disclosure provides a method and device of controlling a virtual mouse and a head-mounted displaying device, in order to solve the problem that the conventional head-mounted displaying devices lack convenient and effective user controlling mode, which limits the development of the applying of 2D applications in head-mounted displaying devices.

According to one aspect of the present disclosure, provided is a method of controlling a virtual mouse, comprising:

utilizing a sensor provided in a head-mounted displaying device to gather a user's head motion data;

calculating the gathered head motion data, to obtain a two-dimensional coordinate value in a coordinate system where a displaying screen of the head-mounted displaying device is located; and controlling a virtual mouse of the head-mounted displaying device to perform a corresponding mouse moving operation on the displaying screen according to the obtained two-dimensional coordinate value.

For example, the head-mounted displaying device is further provided with a key, and the method further comprises: receiving a single-click controlling signal or double-click controlling signal inputted by the user via the key; and according to the single-click controlling signal or double-click controlling signal, controlling the virtual mouse of the head-mounted displaying device to perform a corresponding mouse affirming operation.

For example, the utilizing a sensor provided in a head-mounted displaying device to gather a user's head motion data comprises:

utilizing a three-axis gravity sensor and a three-axis gyroscope provided in the head-mounted displaying device to gather to obtain six-axis data of the user's head motion;

or, utilizing a three-axis gravity sensor, a three-axis gyroscope and a three-axis geomagnetic sensor provided in the head-mounted displaying device to gather to obtain nine-axis data of the user's head motion.

For example, the calculating the gathered head motion data, to obtain a two-dimensional coordinate value in a coordinate system where the displaying screen of the head-mounted displaying device is located comprises:

performing filtering processing on the gathered nine-axis data or six-axis data by filtering algorithm to obtain a corresponding quaternion, utilizing the quaternion to calculate an amount of coordinate offset; and according to a preset initial coordinate value of the virtual mouse in the coordinate system and the amount of coordinate offset, calculating to obtain the two-dimensional coordinate value corresponding to the nine-axis data or the six-axis data.

For example, the after the head-mounted displaying device has been started up, the virtual mouse is displayed in a position corresponding to the preset initial coordinate value on the displaying screen, and the controlling a virtual mouse of the head-mounted displaying device to perform a corresponding mouse moving operation on the displaying screen according to the obtained two-dimensional coordinate value comprises:

when the two-dimensional coordinate value in the coordinate system where the displaying screen of the head-mounted displaying device is located is obtained by calculating according to the user's head motion data, controlling the virtual mouse of the head-mounted displaying device to move from the position corresponding to the initial coordinate value to a position corresponding to the two-dimensional coordinate value on the displaying screen, thereby realizing movement of the virtual mouse.

According to another aspect of the present disclosure, provided is a device of controlling a virtual mouse, comprising:

a data gathering unit, configured to utilize a sensor provided in a head-mounted displaying device to gather a user's head motion data, and send the head motion data to a coordinate value calculating unit;

the coordinate value calculating unit, configured to calculate the gathered head motion data, to obtain a two-dimensional coordinate value in a coordinate system where a displaying screen of the head-mounted displaying device is located, and send the two-dimensional coordinate value to a virtual mouse controlling unit; and the virtual mouse controlling unit, configured to, control a virtual mouse of the head-mounted displaying device to perform a corresponding mouse moving operation on the displaying screen according to the obtained two-dimensional coordinate value.

For example, the device further comprises: a key unit, the key unit configured to receive a single-click controlling signal or double-click controlling signal inputted by the user via a key and send the single-click controlling signal or double-click controlling signal to the virtual mouse controlling unit; and the virtual mouse controlling unit further configured to, according to the single-click controlling signal or double-click controlling signal, control the virtual mouse of the head-mounted displaying device to perform a corresponding mouse affirming operation.

For example, the data gathering unit is configured to utilize a three-axis gravity sensor and a three-axis gyroscope provided in the head-mounted displaying device to gather to obtain six-axis data of the user's head motion; or, configured to utilize a three-axis gravity sensor, a three-axis gyroscope and a three-axis geomagnetic sensor provided in the head-mounted displaying device to gather to obtain nine-axis data of the user's head motion.

For example, the coordinate value calculating unit is configured to perform filtering processing on the gathered nine-axis data or six-axis data by filtering algorithm to obtain a corresponding quaternion, utilize the quaternion to calculate an amount of coordinate offset, and according to a preset initial coordinate value of the virtual mouse in the coordinate system and the amount of coordinate offset, calculate to obtain the two-dimensional coordinate value corresponding to the nine-axis data or the six-axis data.

According to yet another aspect of the present disclosure, further provided is a head-mounted displaying device, comprising: the device of controlling a virtual mouse as described above in the present disclosure.

The advantageous effects of the present disclosure are as follows: the method and device of controlling a virtual mouse of the present disclosure utilizes the sensor built in the head-mounted displaying device to gather the user's head motion data, converts the obtained head motion data into a two-dimensional coordinate value on the displaying screen, and on the basis of the two-dimensional coordinate value controls the moving of the virtual mouse, thereby realizing a convenient controlling mode of controlling a virtual mouse by utilizing the user's head motion. Because the head-mounted displaying device is to be worn at the head of the user at use, during the using the user only needs to turn the head to control the virtual mouse to track the head motion and to move to the corresponding position, which improves the compatibility of 2D applications such as 2D games in the head-mounted displaying device, and greatly riches the content of the head-mounted displaying device. In addition, an embodiment of the present disclosure further provides a head-mounted displaying device, and the head-mounted displaying device can control a virtual mouse according to the user's head motion, thereby improving the compatibility of 2D applications. Compared with the conventional head-mounted displaying devices, the controlling mode is simpler, the compatible contents are richer, and the competitive power of the product is increased.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The core concept of the present disclosure is as follows: it is aimed at the problem that the conventional head-mounted displaying devices lack convenient and effective user interaction controlling mode, which limits the development of the applying of 2D applications in head-mounted displaying devices. The present disclosure, in consideration of the reality that head-mounted displaying devices need to be worn on the head of the user, sets forth a method of controlling a virtual mouse by utilizing the user's head motion. The system of the head-mounted displaying device virtualizes a mouse that is controlled by a sensor, utilizes the sensor to gather the user's head motion data, according to the two-dimensional coordinate value obtained by calculating the head motion data controls the position of the moving of the virtual mouse, and by cooperating with the physical key of the head-mounted displaying device completes the operations of the mouse such as point-and-click and affirming. In such a way, the inconvenience in operation caused by a physical mouse externally connected with the head-mounted displaying device is avoided, which improves the user usage experience. In addition, because of the mode that the virtual mouse is controlled by head motion, the compatibility of 2D applications in the head-mounted displaying device is improved, which riches the content of the head-mounted displaying device.

In the following embodiments illustratively described is the method of controlling a virtual mouse in a head-mounted displaying device. It can be understood that, the method of controlling a virtual mouse of the present embodiment is not limited to being applied to the head-mounted displaying device described here, but can be applied to head-mounted virtual reality devices and head-mounted augmented reality devices, which is not limiting.

The First Embodiment

Figure 1:
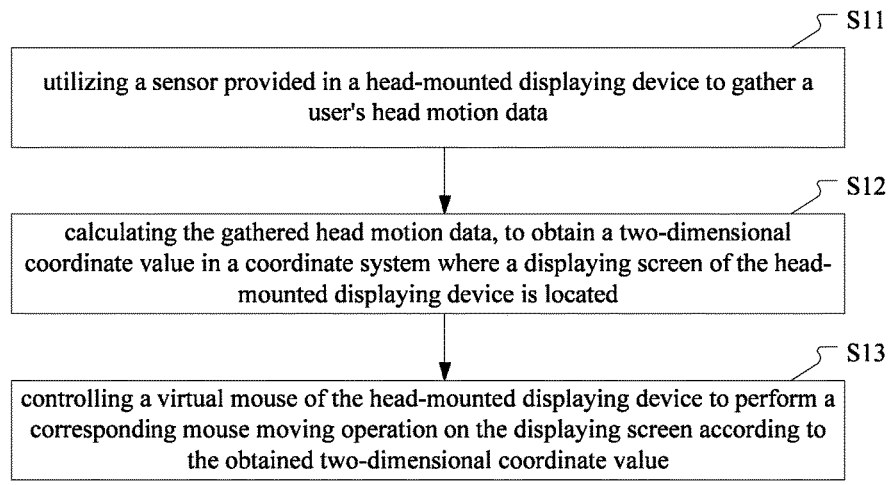
FIG. 1 is a schematic flow chart of a method of controlling a virtual mouse according to an embodiment of the present disclosure.

FIG. 1 is the schematic flow chart of the method of controlling a virtual mouse according to an embodiment of the present disclosure. Referring to FIG. 1, the method comprises the following steps:

Step S11, utilizing a sensor provided in a head-mounted displaying device to gather a user's head motion data;

Step S12, calculating the gathered head motion data, to obtain a two-dimensional coordinate value in a coordinate system where a displaying screen of the head-mounted displaying device is located;

Step S13, controlling a virtual mouse of the head-mounted displaying device to perform a corresponding mouse moving operation on the displaying screen according to the obtained two-dimensional coordinate value. The virtual mouse of the present embodiment is a concept used to distinguish it from the physical mouse externally connected to the head-mounted displaying device.

It can be known from the method shown in FIG. 1 that, the present embodiment gathers the user's head motion data, converts the head motion data into a corresponding two-dimensional coordinate value on the displaying screen, and according to the two-dimensional coordinate value controls the virtual mouse of the head-mounted displaying device to move to the position on the displaying screen corresponding to the two-dimensional coordinate value, by which conveniently, the user, when using the head-mounted displaying device to play 2D applications such as 2D games, can control the movement of the virtual mouse on the displaying screen by only turning the head, which greatly improves the user usage experience.

The Second Embodiment

Figure 2:
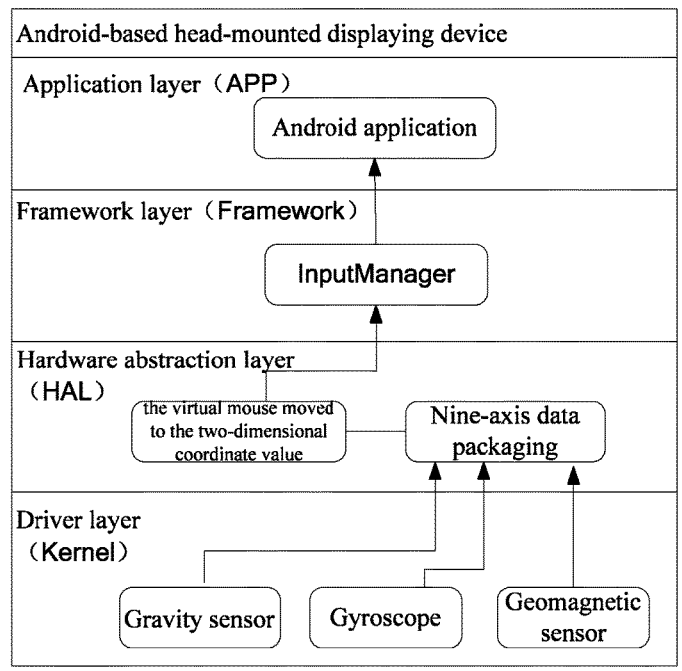
FIG. 2 is a schematic representation of a method of controlling a virtual mouse according to another embodiment of the present disclosure.

FIG. 2 is the schematic representation of the method of controlling a virtual mouse according to another embodiment of the present disclosure. Referring to FIG. 2, the method of controlling a virtual mouse of the present embodiment is realized on the basis of the Android platform, that is, the head-mounted displaying device has been installed therein an Android operating system, and is provided with a sensor and physical keys.

After the system of the head-mounted displaying device boots and starts up, the system firstly controls to display a virtual mouse in the position corresponding to a preset initial coordinate value on the displaying screen (such as displaying a mouse pointer), and then when the user that wears the device is turning the head, the sensor gathers data in real time.

Referring to FIG. 2, Step 2.1, wherein the driver application of the driver layer (Kernel) gathers data from a nine-axis sensor of the head-mounted displaying device, to obtain the nine-axis data of the user's head motion, and then uploads the nine-axis data to a hardware abstraction layer via an interface.

In order to ensure that the gathered user's head motion data is more accurate, and in turn to ensure that a correct two-dimensional coordinate value is obtained, in the present embodiment the head-mounted displaying device is provided with a three-axis gravity sensor (for gathering three-axis linear acceleration data), a three-axis gyroscope (for gathering three-axis angular velocity data) and a three-axis geomagnetic sensor (for gathering three-axis angle data), which are used to gather the nine-axis data of the user's head motion. It should be explained that, in other embodiments of the present disclosure, there can be only a three-axis gravity sensor and a three-axis gyroscope to gather six-axis data of the user's head motion, and the geomagnetic sensor is not provided, which is not limiting. The geomagnetic sensor refers to a sensor that utilizes the difference of motion states of the object to be measured in the geomagnetic field to indicate the information of the object to be measured such as position and moving angle via the change of the distribution of induced geomagnetic field.

Referring to FIG. 2, Step 2.2, wherein the hardware abstraction layer (HAL) performs algorithm implementation, to convert the gathered nine-axis data into a two-dimensional coordinate value in the coordinate system (XOY) of the plane where the corresponding displaying screen is located.

In that, the data conversion algorithm is, performing filtering processing on the gathered nine-axis data by filtering algorithm (such as the Kalman filtering algorithm) to obtain a corresponding quaternion, utilizing the quaternion to calculate an amount of coordinate offset; and according to a preset initial coordinate value of the virtual mouse in the screen coordinate system and the amount of coordinate offset, calculating to obtain the two-dimensional coordinate value corresponding to the nine-axis data or the six-axis data. In that, the quaternion is a simple hypercomplex number. A quaternion consists of one real number plus three imaginary units i, j and k, and the geometric meaning of i, j and k can be understood as rotation, wherein the i rotation represents the rotation from the X-axis positive direction to the Y-axis positive direction in the intersecting plane of the X-axis and the Y-axis, the j rotation represents the rotation from the Z-axis positive direction to the X-axis positive direction in the intersecting plane of the Z-axis and the X-axis, the k rotation represents the rotation from the Y-axis positive direction to the Z-axis positive direction in the intersecting plane of the Y-axis and the Z-axis, and −i, −j and −k respectively represent the reverse rotations of the i, j and k rotations.

That is to say, the flow of the data conversion algorithm can be summarized as: the nine-axis data→via the filtering algorithm→a quaternion (x, y, z, w)→Taking the (x*cos(w), y*cos(w)) of the quaternion as the amount of coordinate offset of the corresponding displaying screen→according to the initial coordinate value and the amount of coordinate offset, obtaining the two-dimensional coordinate value (X, Y) that the virtual mouse should be moved to.

It should be explained that, how to convert the gathered nine-axis data into the corresponding two-dimensional coordinate value is not the keynote of the present disclosure and is the content of the prior art, and its detailed implementing can refer to the detailed calculating procedure of the algorithm of the prior art and will not be discussed further here.

After obtaining the two-dimensional coordinate value of the corresponding displaying screen that the virtual mouse should be moved to, the system controls the pointer of the virtual mouse of the head-mounted displaying device to move from a position corresponding to the initial coordinate value to a position corresponding to the two-dimensional coordinate value on the displaying screen, thereby realizing the movement of the virtual mouse. Then the system by referring to the captured key controlling signal affirms that movement of the virtual mouse.

Specially, the key controlling signal can be a single-click controlling signal or a double-click controlling signal inputted by the user, and according to the single-click controlling signal or double-click controlling signal, the system controls the virtual mouse of the head-mounted displaying device to perform a corresponding mouse affirming operation. For example, when the system receives the controlling signal the user inputs by single-clicking the key, the system controls to check the object pointed by the pointer of the virtual mouse, and when the system receives the controlling signal the user inputs by double-clicking the key, the system controls to open the object pointed by the pointer of the virtual mouse.

Referring to FIG. 2, Step 2.3, wherein the hardware abstraction layer via the mouse interface of the Android system submits the two-dimensional coordinate value to the InputManager of the framework layer, and the InputManager notifies the application corresponding to the two-dimensional (that is, 2D) coordinate value on the displaying screen, and distributes the mouse moving and affirmation event to specific applications of the application layer.

Step 2.4, wherein the Android application, after receiving the mouse moving and affirmation event sent by the InputManager, does not need to know whether that is a virtual mouse or not, and only needs to response to the mouse event.

A special application scene corresponding to the method of controlling a virtual mouse of the present embodiment is that: the head-mounted displaying device starts up and displays desktop icons on the displaying screen, then detects head motion (the hardware abstraction layer performs real-time calculation on the head motion data to obtain a two-dimensional coordinate value), and according to the head motion checks an application icon (the hardware abstraction layer uploads the two-dimensional coordinate value to the framework layer and the framework layer controls the pointer of the virtual mouse to point the application icon corresponding to the two-dimensional coordinate value). Subsequently, when detecting that the user presses the key on the head-mounted displaying device, the hardware abstraction layer notifies the application corresponding to the application icon of the application layer of the mouse affirming operation, and finally opens and enters the checked application.

The Third Embodiment

Figure 3:
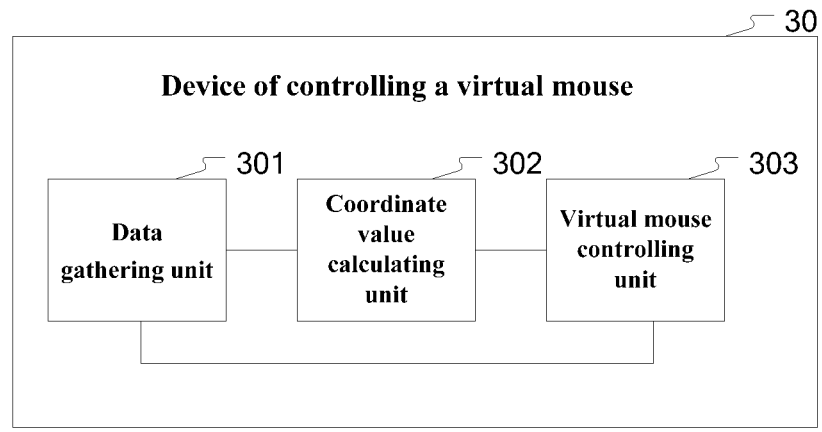
FIG. 3 is a structural block diagram of a device of controlling a virtual mouse according to an embodiment of the present disclosure.

FIG. 3 is the structural block diagram of the device of controlling a virtual mouse according to an embodiment of the present disclosure. Referring to FIG. 3, the device 30 of controlling a virtual mouse of the present embodiment comprises:

a data gathering unit 301, configured to utilize a sensor provided in a head-mounted displaying device to gather a user's head motion data, and send the head motion data to a coordinate value calculating unit 302;

the coordinate value calculating unit 302, configured to calculate the gathered head motion data, to obtain a two-dimensional coordinate value in a coordinate system where a displaying screen of the head-mounted displaying device is located, and send the two-dimensional coordinate value to a virtual mouse controlling unit 303; and the virtual mouse controlling unit 303, configured to, control a virtual mouse of the head-mounted displaying device to perform a corresponding mouse moving operation on the displaying screen according to the obtained two-dimensional coordinate value.

In another embodiment of the present disclosure, the device further comprises: a key unit, the key unit configured to receive a single-click controlling signal or double-click controlling signal inputted by the user via the key and send the single-click controlling signal or double-click controlling signal to the virtual mouse controlling unit; and the virtual mouse controlling unit further configured to, according to the single-click controlling signal or double-click controlling signal, control the virtual mouse of the head-mounted displaying device to perform a corresponding mouse affirming operation.

In another embodiment of the present disclosure, the data gathering unit is configured to utilize a three-axis gravity sensor and a three-axis gyroscope provided in the head-mounted displaying device to gather to obtain six-axis data of the user's head motion; or, utilize a three-axis gravity sensor, a three-axis gyroscope and a three-axis geomagnetic sensor provided in the head-mounted displaying device to gather to obtain nine-axis data of the user's head motion.

In another embodiment of the present disclosure, the coordinate value calculating unit is configured to perform filtering processing on the gathered nine-axis data or six-axis data by filtering algorithm to obtain a corresponding quaternion, utilize the quaternion to calculate an amount of coordinate offset, and according to a preset initial coordinate value of the virtual mouse in the coordinate system and the amount of coordinate offset, calculate to obtain the two-dimensional coordinate value corresponding to the nine-axis data or the six-axis data.

It should be explained that, the working process of the device of controlling a virtual mouse of the present disclosure is corresponding to the realizing steps of the method of controlling a virtual mouse described above, and the special working process of the device of controlling a virtual mouse can be obtained by referring to the relevant description of the method of controlling a virtual mouse described above and will not be discussed further here.

The Fourth Embodiment

Figure 4:
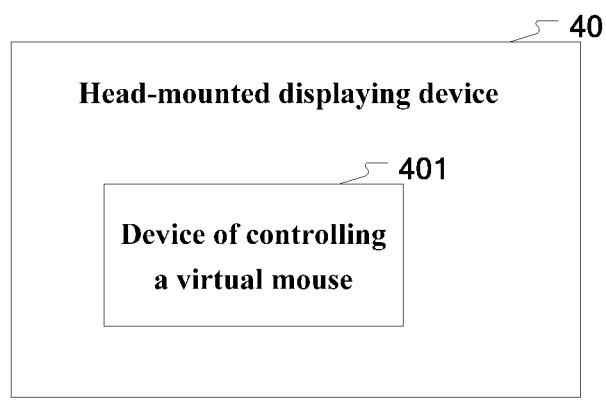
FIG. 4 is a structural block diagram of a head-mounted displaying device according to an embodiment of the present disclosure.
Figure 5:
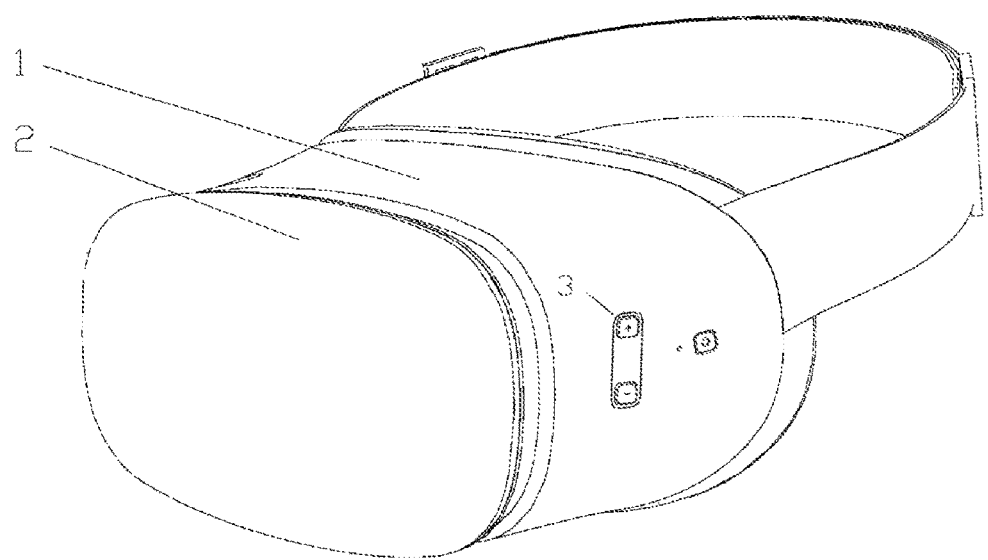
FIG. 5 is a structural diagram of a head-mounted displaying device according to an embodiment of the present disclosure, wherein, reference numeral 1 indicates the head-mounted displaying device, reference numeral 2 indicates the displaying screen, and reference numeral 3 indicates the physical key.

FIG. 4 is the structural block diagram of the head-mounted displaying device according to an embodiment of the present disclosure. Referring to FIG. 4, the head-mounted displaying device of the present embodiment comprises: a device 401 of controlling a virtual mouse. The device 401 of controlling a virtual mouse can utilize a sensor installed in the head-mounted displaying device to gather a user's head motion data, calculate the gathered head motion data, to obtain a two-dimensional coordinate value in a coordinate system where a displaying screen of the head-mounted displaying device is located; and then control a virtual mouse of the head-mounted displaying device to perform a corresponding mouse moving operation on the displaying screen according to the obtained two-dimensional coordinate value.

Therefore, compared with the conventional head-mounted displaying devices, the head-mounted displaying device of the present embodiment provides a controlling mode of controlling the moving of a virtual mouse according to the user's head motion. The mode does not need an externally connected physical mouse, which facilitates user operation, and the mode enables head-mounted displaying devices to make 2D applications such as 2D games compatible, which riches the content of the head-mounted displaying device and improves the competitive power of the head-mounted displaying device.

In conclusion, the technical solution of the present disclosure, in consideration of the reality that head-mounted displaying devices need to be worn on the head of the user, sets forth a controlling mode of controlling a virtual mouse by utilizing the user's head motion. The system of the head-mounted displaying device virtualizes a mouse that is controlled by a sensor, utilizes the sensor to gather the user's head motion data, according to the two-dimensional coordinate value obtained by calculating the head motion data controls the position of the moving of the virtual mouse, and by cooperating with the physical key of the head-mounted displaying device completes the operations of the mouse such as point-and-click and affirming. In such a way, the inconvenience in operation caused by a physical mouse externally connected with the head-mounted displaying device is avoided, which improves the user usage experience. Furthermore, because the interaction mode with the user of the virtual mouse is controlled by head motion, the compatibility of 2D applications in the head-mounted displaying device is improved, which riches the content of the head-mounted displaying device and increases the competitive power of the product.

What are described above are only preferred embodiments of the present disclosure and not intended to limit the protection scope of the present disclosure. Any modifications, equivalent substitutions and improvements made within the spirit and principle of the present disclosure are all included in the protection scope of the present disclosure.

It should be explained that:

The embodiments of the components of the present disclosure can be implemented as hardware, as a software module executed on one or more processors, or as their combination. A person skilled in the art should understand that, microprocessors or digital signal processors (DSP) can be employed in practice to implement some or all of the functions of some or all of the components according to the embodiments of the present disclosure. The present disclosure can also be implemented as devices or device programs for executing some or all of the method described herein (for example, computer programs and computer program products). Such programs for implementing the present disclosure can be stored in computer readable media, or can be in the form of one or more signals. Such signals can be obtained by being downloaded from internet websites, or be provided by carrier signals, or be provided in any other forms.

The device of controlling a virtual mouse of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the device of controlling a virtual mouse executes each of the steps of the method described above.

It should be noted that, the above embodiments are intended to illustrate the present disclosure, rather than limiting the present disclosure, and a person skilled in the art can design alternative embodiments without departing from the scope of the attached claims. The word "comprise" does not exclude the elements or steps that are not listed in the claims. The present disclosure can be implemented by means of hardware that comprise numbers of different elements and by means of computers that are properly programmed. In claims that list numbers of units of devices, some of these devices can be embodied via the same hardware item.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not chosen to interpret or define the subject matter of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A method of controlling a virtual mouse, wherein the method is applied to a head-mounted displaying device and comprises:

after the head-mounted displaying device has been started up, displaying a virtual mouse in a position corresponding to a preset initial coordinate value on a displaying screen of the head-mounted displaying device;

utilizing a sensor provided in the head-mounted displaying device to gather a user's head motion data;

calculating the gathered head motion data, to obtain a two-dimensional coordinate value that the virtual mouse should be move to in a coordinate system where the displaying screen is located;

controlling the virtual mouse to move from the position corresponding to the initial coordinate value to a position corresponding to the obtained two-dimensional coordinate value on the displaying screen to perform a corresponding mouse moving operation;

receiving a single-click controlling signal or double-click controlling signal inputted by the user via a physical key, wherein the physical key is provided on the head-mounted displaying device; and according to the single-click controlling signal or double-click controlling signal, controlling the virtual mouse to perform a corresponding mouse affirming operation.

2. The method according to claim 1, wherein the utilizing a sensor provided in the head-mounted displaying device to gather a user's head motion data comprises:

utilizing a three-axis gravity sensor and a three-axis gyroscope provided in the head-mounted displaying device to gather to obtain six-axis data of the user's head motion;

or, utilizing a three-axis gravity sensor, a three-axis gyroscope and a three-axis geomagnetic sensor provided in the head-mounted displaying device to gather to obtain nine-axis data of the user's head motion.

3. The method according to claim 2, wherein the calculating the gathered head motion data, to obtain a two-dimensional coordinate value that the virtual mouse should be move to in a coordinate system where the displaying screen is located comprises:

performing filtering processing on the gathered nine-axis data or six-axis data by filtering algorithm to obtain a corresponding quaternion, utilizing the quaternion to calculate an amount of coordinate offset; and according to a preset initial coordinate value of the virtual mouse in the coordinate system and the amount of coordinate offset, calculating to obtain the two-dimensional coordinate value corresponding to the nine-axis data or the six-axis data.

4. A device of controlling a virtual mouse, wherein the device is provided in a head-mounted displaying device and comprises: a processor and a computer readable medium, wherein the computer readable medium stores a computer readable code that is readable by the processor, and the processor executes the computer readable code to perform the following steps:

after the head-mounted displaying device has been started up, displaying a virtual mouse in a position corresponding to a preset initial coordinate value on a displaying screen of the head-mounted displaying device;

utilizing a sensor provided in the head-mounted displaying device to gather a user's head motion data;

calculating the gathered head motion data, to obtain a two-dimensional coordinate value that the virtual mouse should be move to in a coordinate system where the displaying screen is located;

controlling the virtual mouse to move from the position corresponding to the initial coordinate value to a position corresponding to the obtained two-dimensional coordinate value on the displaying screen to perform a corresponding mouse moving operation;

receiving a single-click controlling signal or double-click controlling signal inputted by the user via a physical key, wherein the physical key is provided on the head-mounted displaying device; and according to the single-click controlling signal or double-click controlling signal, controlling the virtual mouse to perform a corresponding mouse affirming operation.

5. The device of controlling a virtual mouse according to claim 4, wherein the utilizing a sensor provided in the head-mounted displaying device to gather a user's head motion data comprises:

utilizing a three-axis gravity sensor and a three-axis gyroscope provided in the head-mounted displaying device to gather to obtain six-axis data of the user's head motion; or, utilizing a three-axis gravity sensor, a three-axis gyroscope and a three-axis geomagnetic sensor provided in the head-mounted displaying device to gather to obtain nine-axis data of the user's head motion.

6. The device of controlling a virtual mouse according to claim 5, wherein the calculating the gathered head motion data, to obtain a two-dimensional coordinate value that the virtual mouse should be move to in a coordinate system where the displaying screen is located comprises:

performing filtering processing on the gathered nine-axis data or six-axis data by filtering algorithm to obtain a corresponding quaternion, utilizing the quaternion to calculate an amount of coordinate offset, and according to a preset initial coordinate value of the virtual mouse in the coordinate system and the amount of coordinate offset, calculating to obtain the two-dimensional coordinate value corresponding to the nine-axis data or the six-axis data.

7. A head-mounted displaying device, comprises: a sensor, a physical key, a processor and a computer readable medium, wherein the computer readable medium stores a computer readable code that is readable by the processor, and the processor executes the computer readable code to perform the following steps:

after the head-mounted displaying device has been started up, displaying a virtual mouse in a position corresponding to a preset initial coordinate value on a displaying screen of the head-mounted displaying device;

utilizing the sensor provided in the head-mounted displaying device to gather a user's head motion data;

calculating the gathered head motion data, to obtain a two-dimensional coordinate value that the virtual mouse should be move to in a coordinate system where the displaying screen is located;

controlling the virtual mouse to move from the position corresponding to the initial coordinate value to a position corresponding to the obtained two-dimensional coordinate value on the displaying screen to perform a corresponding mouse moving operation;

receiving a single-click controlling signal or double-click controlling signal inputted by the user via the physical key, wherein the physical key is provided on the head-mounted displaying device; and according to the single-click controlling signal or double-click controlling signal, controlling the virtual mouse to perform a corresponding mouse affirming operation.

8. The head-mounted displaying device according to claim 7, wherein the utilizing the sensor provided in the head-mounted displaying device to gather a user's head motion data comprises:

utilizing a three-axis gravity sensor and a three-axis gyroscope provided in the head-mounted displaying device to gather to obtain six-axis data of the user's head motion; or, utilizing a three-axis gravity sensor, a three-axis gyroscope and a three-axis geomagnetic sensor provided in the head-mounted displaying device to gather to obtain nine-axis data of the user's head motion.

9. The head-mounted displaying device according to claim 8, wherein the calculating the gathered head motion data, to obtain a two-dimensional coordinate value that the virtual mouse should be move to in a coordinate system where the displaying screen is located comprises:

performing filtering processing on the gathered nine-axis data or six-axis data by filtering algorithm to obtain a corresponding quaternion, utilizing the quaternion to calculate an amount of coordinate offset, and according to a preset initial coordinate value of the virtual mouse in the coordinate system and the amount of coordinate offset, calculating to obtain the two-dimensional coordinate value corresponding to the nine-axis data or the six-axis data.

* * * * *